Sept. 11, 1962     F. J. WOOD     3,053,390
SEWAGE TREATING APPARATUS
Filed April 24, 1957     3 Sheets-Sheet 1

INVENTOR.
FRED J. WOOD

Sept. 11, 1962 F. J. WOOD 3,053,390
SEWAGE TREATING APPARATUS
Filed April 24, 1957 3 Sheets-Sheet 2

INVENTOR.
FRED J. WOOD
BY Woodling + Krost
Atty's.

Sept. 11, 1962 — F. J. WOOD — 3,053,390
SEWAGE TREATING APPARATUS
Filed April 24, 1957 — 3 Sheets-Sheet 3

INVENTOR.
FRED J. WOOD
BY Woodling & Krost
Atty's.

United States Patent Office 3,053,390
Patented Sept. 11, 1962

3,053,390
SEWAGE TREATING APPARATUS
Fred J. Wood, 4864 Henry St., Cleveland 25, Ohio
Filed Apr. 24, 1957, Ser. No. 654,705
13 Claims. (Cl. 210—195)

The invention relates in general to apparatus for treating sewage and more particularly to such apparatus for recirculating, and introducing large quantities of air into, the sewage being treated. The invention also relates to a novel housing for protecting a driving power source, preferably an electric motor, which is utilized in combination with the apparatus.

The sewage which enters any treating apparatus contains solids which are acted upon by bacteria to decompose the same and render to the sewage "stable." Over a period of time a sludge normally forms at the bottom of a treating tank. It is contemplated by the present invention to keep in a state of agitation and reduce to small particles this sludge while mixing with it large quantities of air. These small particles are acted upon by large numbers of bacteria in the process of aerobic bacterial decomposition and these thus acted upon particles are commonly referred to as "flock." The growth of the bacteria is dependent upon a plentiful supply of air, hence the reason for mixing the particles with the same.

It is also desirable that the flock, which tends to drift towards different portions of a treating apparatus be continuously recirculated and remixed with air until the same is relatively stable which means that it has reached a stability where it is acceptable from a health standpoint.

It is therefore an object of the present invention to provide a sewage treating apparatus which will mix a plentiful supply of air with particles of sewage to decompose the same and which will recirculate the particles until they are decomposed and stable.

Another object of the invention is to provide a sewage treating apparatus wherein sewage which is treated passes therefrom in a stable condition.

Another object of the invention is to provide a sewage treating apparatus with means for removing the froth, normally present on the surface of the liquid contained therein, and agitating and mixing it with air to destroy the same.

Another object of the invention is to provide a sewage treating apparatus which will prevent unstable material from passing therefrom until completely decomposed.

Another object of the invention is to provide a sewage treating apparatus with a novel means for introducing air thereinto which includes passing the air over a motor which is utilized to circulate and draw in the air.

Another object of the invention is to provide a means of housing a motive power source which will substantially prevent the same from becoming inundated in the event of inclement weather conditions.

Another object of the invention is to provide an impeller with first and second sides in combination with a conduit bringing air to the first side and a conduit bringing sewage to the second side to intimately intermix the two together.

Another object of the invention is to provide a sewage treating apparatus with a novel valving and piping arrangement to return flock from one chamber of the apparatus to another.

Other objects and a fuller understanding of the invention may be had by referring to the following description and claims, taken in conjunction with the accompanying drawing, in which:

Figure 1:
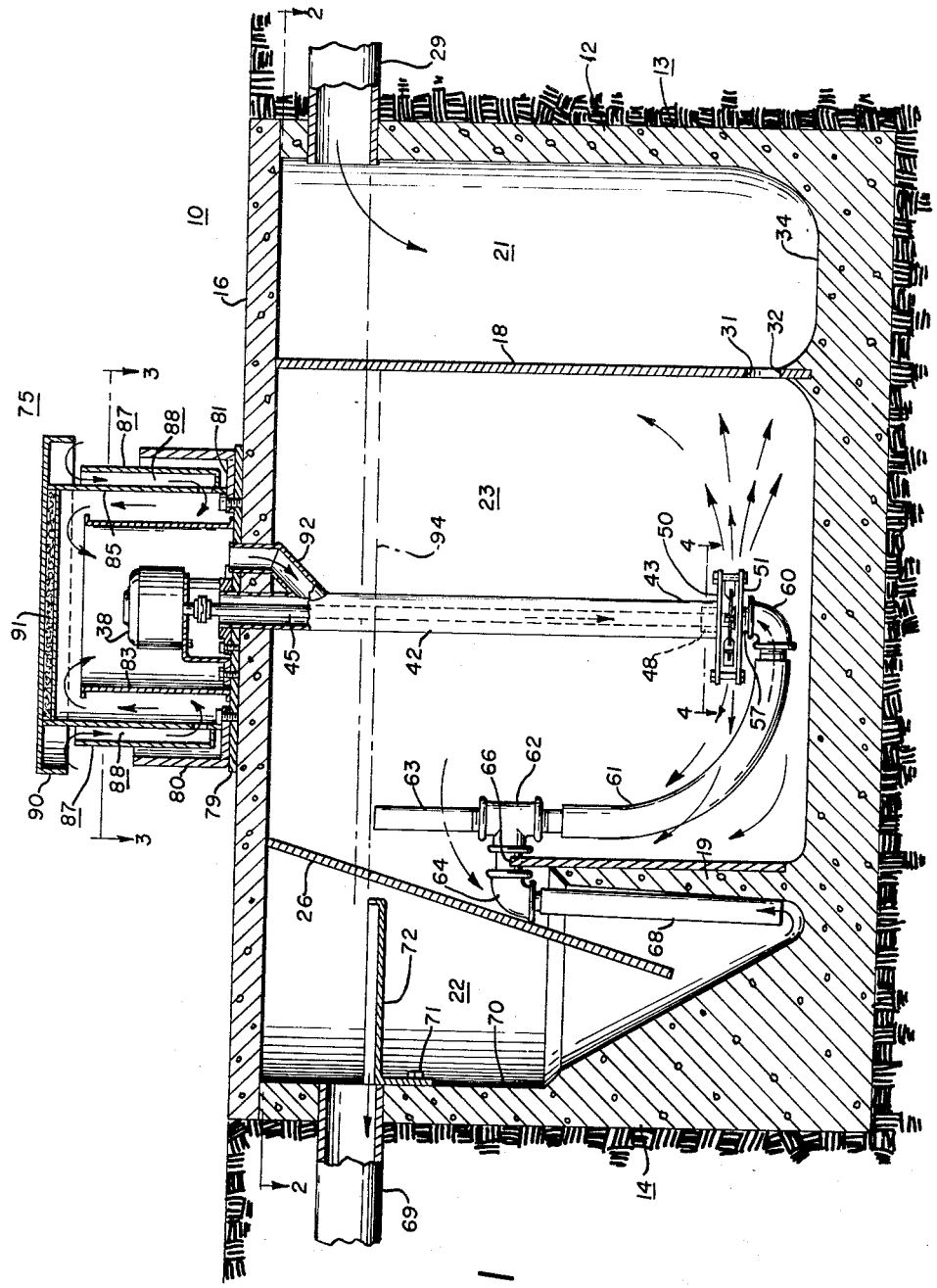
FIGURE 1 is a side elevational view in section of the sewage treating apparatus of the present invention.

Referring to FIGURE 1, the sewage treating apparatus is indicated generally by the reference numeral 10 and includes a concrete tank 12 which has first and second end portions 13 and 14. The tank 12 is adapted to reside in an excavation in the ground with the upper open end thereof extending to about ground level. A concrete cover 16 resides on and closes the upper open end of the tank 12. Although the tank and cover have been described as being made from concrete, it will be readily apparent that the materials of construction might be widely varied without departing from the teachings of the present invention. First and second walls 18 and 19, respectively, divide the tank 12 into inlet, outlet, and intermediate chambers 21, 22 and 23, respectively. These chambers may also be referred to as first, second and third chambers. It will be specifically noted that the wall 18 extends from the bottom of the tank to the cover 16 thereby forming a substantially closed chamber 21, whereas the wall 19 extends from the bottom of the tank only approximately half-way to the cover 16. A baffle 26 cooperates with the wall 19 to define the chamber 22. The baffle extends from the top of the tank and angles toward the second end portion 14 of the tank, being spaced from the wall 19 to form an opening between the outlet chamber 22 and the intermediate chamber 23.

Figure 5:
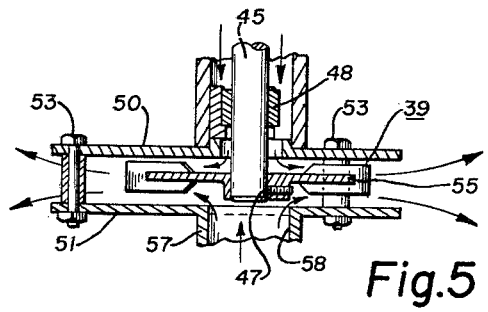
FIGURE 5 is a view taken along the line 5—5 of FIGURE 4.

An inlet conduit 29 provides for the entrance of sewage into the inlet chamber 21 and would be connected to a dwelling house or other building which the sewage treating apparatus is adapted to serve. Wall means 31 are provided in the first wall 18 and define an opening 32 therein which is spaced from the bottom 34 of the chamber 21. This opening 32 provides for the passage of sewage from chamber 21 to chamber 23. To provide for the agitation of sewage within the chamber 23 and also for the introduction of plentiful quantities of air to be admixed with the sewage in this chamber, air introduction and agitation means have been constructed. These means include a motive power source 38 which is preferably an electric motor and an impeller 39 within the chamber 23. The impeller may also be referred to as pump means. A tubular member 42 extends through the cover 16 and is mounted thereby and extends vertically into the chamber 23 with the lower end portion 43 thereof ending in spaced relation to the bottom of the chamber 23. The motor 38 is mounted on the cover 16 of the tank over the upper end of the tubular member 42. A drive shaft 45 is connected at its upper end portion to the motor 38 and extends downwardly through the tubular member 42. The impeller 39 is secured to the lower end portion of the drive shaft 45 by suitable means such as a set screw 47 (FIGURE 5) and when the motor 38 drives the shaft 45, it also rotates the impeller 39. The lower end portion of the drive shaft 45 is journalled in a bearing 48. The lower end portion 43 of the tubular member 42 is provided with a first flange 50 secured thereto which serves as a housing for and covers the upper portion of the impeller. A second flange 51 is spaced from the flange 50 a distance slightly greater than the width of the impeller and is fixedly secured in this position by means of bolts 53. The flanges 50 and 51 serve as a housing for the impeller 39. The impeller 39 includes a plate 55 which has a plurality of generally radially extending blades 56, each of which are curved arcuately slightly away from the direction of rotation. These blades, as will be noted from FIGURE 5, are of greater width above the plate 55 or on the first flange side than they are on the underside of the plate 55, or on the second flange side. They are preferably about twice as wide on top as on the bottom. This produces the proper low pressure area to bring air down the tubular member and to bring sewage which includes flock in toward the underside of the impeller. The second flange 51 is in itself a fitting of the male nipple type 57 which includes wall means which define an opening 58. This opening 58 provides for entrance of material on the underside of the impeller. Connected to the nipple 57 is a 90 degree elbow 60 (FIGURE 1) to which is secured a piece of pipe or conduit 61 which is preferably, although not necessarily, made of plastic or rubber material, which extends to a T fitting 62. Extending vertically upwardly from the T fitting 62 is a short piece of pipe or conduit 63.

Extending from another leg of the T fitting 62 is another 90 degree elbow 64 which rests upon the upper edge 66 of the wall 19. From the elbow 64 a piece of pipe 68 extends toward and nearly to the bottom of the outlet chamber 22. The piping which includes the nipple 57, the elbow 60, the pipe 61, the T 62 and the pipe 63, may be referred to for the sake of convenience, as first conduit means. The elbow 64 and pipe 68 may be referred to as second conduit means. The second conduit means extend from the intermediate chamber to the outlet chamber by means of the opening provided by the baffle 26 and wall 19. An outlet conduit 69 provides communication from the outlet chamber and the tank, of sewage which has been treated by the apparatus and which has been rendered stable. Secured to a wall 70 by bolts 71 is a weir 72 which regulates the liquid level of the tank and serves to skim off only the uppermost portion of the outlet chamber.

The motor 38 is provided with a housing assembly indicated generally by the reference numeral 75 to keep it protected from outside influences. The housing assembly includes the plate 79 which the motor 38 is mounted on and also includes an outside annular member 80 which has mounting ears 81. Bolts 82 extend through these mounting ears 81 and into the plate 79 for securing this member in a fixed position. An inner annular member 83 having an open upper end surrounds the motor 38 with the lower end thereof resting on the plate 79. An annular cover 85 surrounds the inner annular member 83 and resides inside of the outer annular member 80. The lower peripheral edge of the annular cover 85 rests on the mounting ears 81 immediately adjacent the bolts 82. The cover 85 is fixedly secured in position by means which have not been specifically described or shown. The annular cover 85 has wall means 87 on either side thereof which define passages 88 which provide for the entrance of air into the housing assembly 75. The top portion of the annular cover 85 is provided with annular overhanging lip 90 which prevents material from entering the passages 88. Insulation 91 is provided for minimizing changes in temperature within the housing because of outside temperature conditions. A tube 92 provides communication between the inside of the inner annular member 83 and the tubular member 42.

In operation raw sewage enters the inlet chamber 21 through the inlet conduit 29. This raw sewage will include a mixture of solid and liquid material. This sewage then passes from the chamber 21 into the intermediate chamber 23 through the opening 32. In the event any extremely heavy material such as wearing material, or the like, happens to pass into the system, this would immediately fall to the bottom 34 of the chamber 21 and past the opening 32 and would not pass into the intermediate chamber 23 until sufficiently decomposed. The electric motor 38 is connected to a suitable electrical supply (not shown) and is energized and de-energized by a control mechanism which also is not shown. The frequency and duration of the operation of the motor will be dependent upon many factors among which would include the number of people utilizing the sewage system which the apparatus is serving. Actuation of the motor 38 will cause the drive shaft 45 and hence the impeller 39 to be rotated. This causes a low pressure area at the impeller which in turn causes air to be drawn into the housing assembly 75 by way of the passages 88 immediately beneath the overhanging lip 90, up between the walls of the annular cover and the inner annular member 83, over the upper edge of the inner annular member 83, past the electric motor 38 and down the tubular member 42. The normal liquid level in the tank has been indicated generally by the line 94. In apparatus of this type, a froth or scum usually collects on the liquid level of the tank which contains material which has not been sufficiently decomposed to be rendered stable and this material is withdrawn from the surface of the intermediate chamber by way of the first conduit means which brings the material to the impeller where it is again physically agitated and mixed with air which is drawn down the tubular member 42. As the sewage or sludge is constantly agitated and broken into finer and finer particles which are called "flock" the flock will, when it becomes light enough, pass through the opening from the intermediate to the outlet chamber. This material is prevented from passing over the weir and out the outlet conduit by means of the baffle 26 which causes this material to settle to the bottom of the outlet chamber 22. The action of the impeller drawing material through the first conduit means causes a low pressure at the junction of the first and second conduit means which causes the flock which is settled in the bottom of the outlet chamber to be drawn up the pipe 68 and back to the impeller 39 where this material is again physically agitated and mixed with a new supply of air. As a result of this treatment, the liquid flowing over the weir 72 and out the outlet conduit 69 is in a stable condition and is no longer dangerous from a health standpoint. The housing assembly 75 is constructed in such a way that water is prevented from falling into the interior thereof and the air which is drawn through the housing to the impeller is caused to pass over the electric motor 38 keeping the motor at a safe operating temperature. The construction of the housing assembly also aids in preventing the motor from becoming inundated in the event of a heavy supply of surface water. If there is a great deal of surface water, it will tend to flow over the top of the concrete cover 16 and cover the plate 79 running into the interior of the housing. As it starts to rise toward the motor proper, air will be trapped above the water within the annular cover 85. As the water rises, the air which is trapped will become compressed which will in turn tend to keep the water level down, within limits. The water will, of course, also run down the tube 92 and the tubular member 42 into the intermediate chamber 23.

Figure 2:
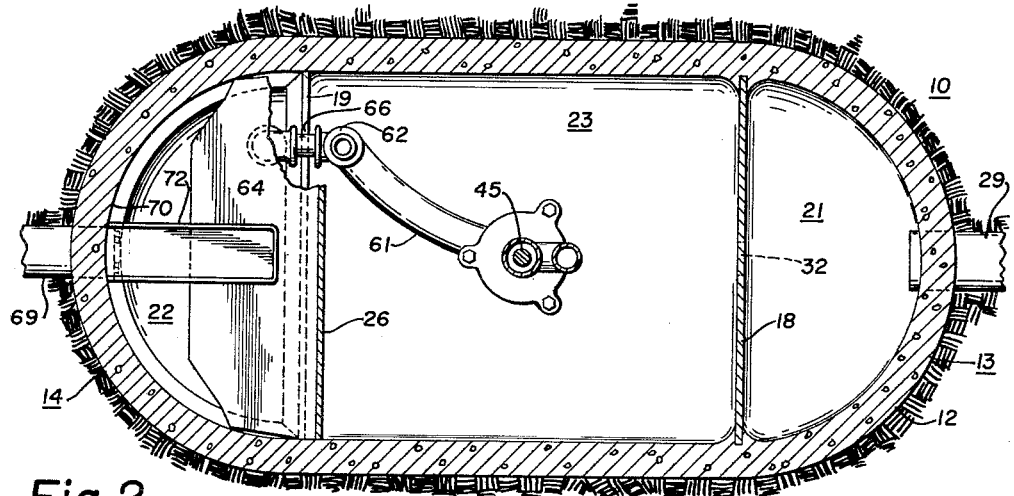
FIGURE 2 is a plan view of the apparatus on a reduced scale taken along the line 2—2 of FIGURE 1.
Figure 3:
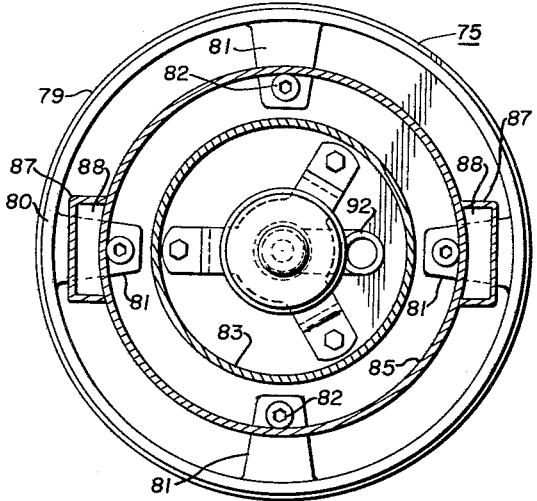
FIGURE 3 is a view taken along the line 3—3 of FIGURE 1.
Figure 4:
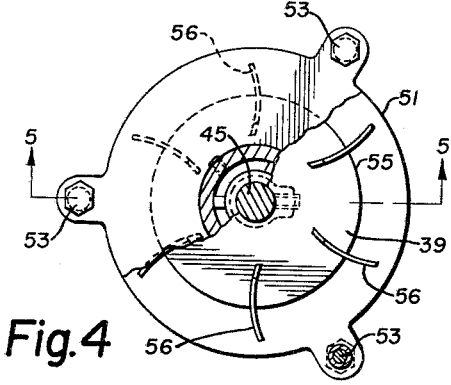
FIGURE 4 is a view taken along the line 4—4 of FIGURE 1.
Figure 6:
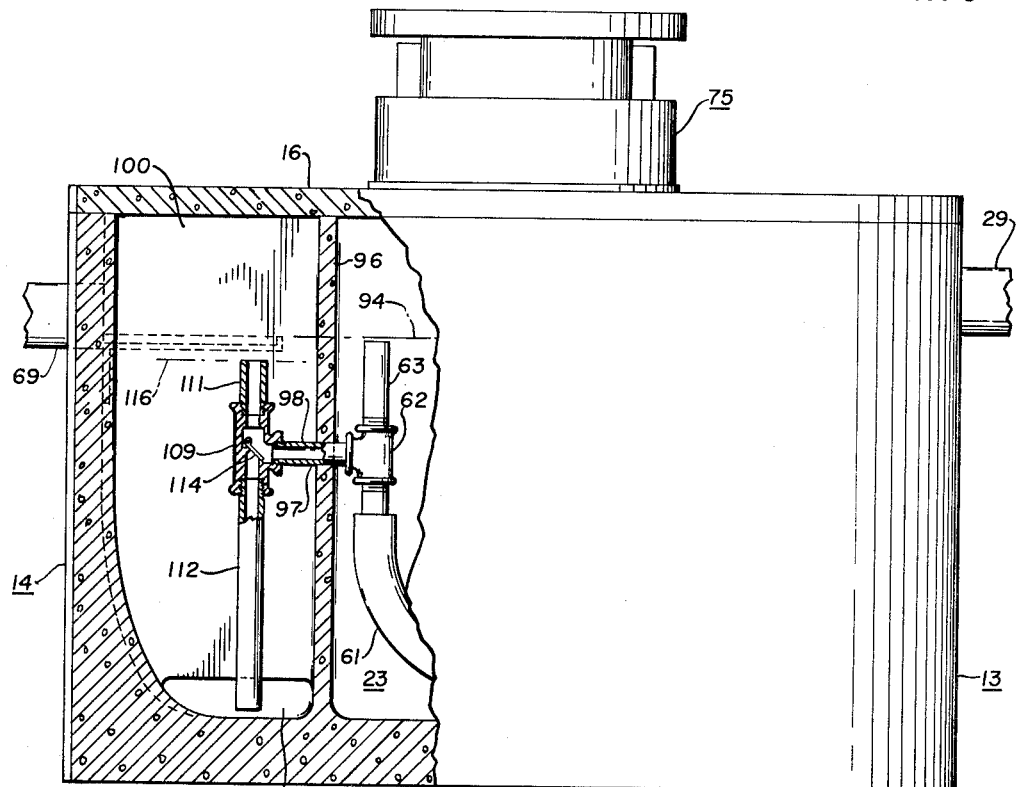
FIGURE 6 is a side elevational view partially in section showing a modification of the sewage treating apparatus illustrated in FIGURE 1.
Figure 7:
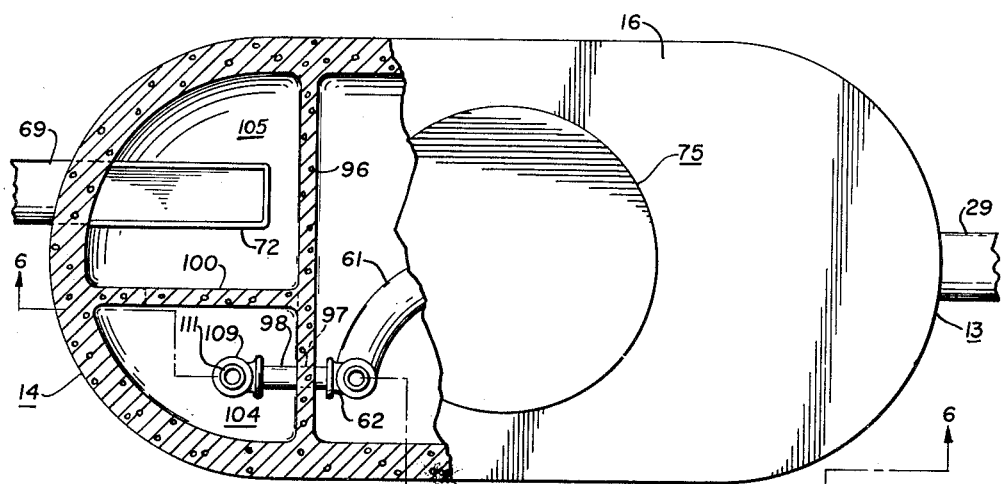
FIGURE 7 is a plan view partially in section of the apparatus shown in FIGURE 6.

The apparatus which is shown in FIGURES 6 and 7 is a modification of the apparatus shown in FIGURES 1 and 2. Where the construction is the same as in FIGURES 1 and 2, like numerals will be utilized, and where a different construction is employed, different reference numerals will be utilized. In the apparatus of FIGURE 6, a wall 96 is provided which extends from the bottom of the tank to the top adjacent the cover 16 completely closing off the portion of the tank left of the wall 96 as seen in FIGURES 6 and 7. The only opening in the wall 96 is at 97 and through this opening extends a piece of pipe 98 which extends into the T fitting 62. Another wall 100 extends from the wall 96 generally normal thereto, to the end portion 14 of the tank. This divides the end portion 14 of the tank into chambers 104 and 105, respectively. The wall 100 extends at the upper portion thereof to the top of the tank adjacent the concrete cover 16 and is spaced from the bottom of the tank to provide an opening 108. This opening 108 permits passage of liquid from chamber 104 to chamber 105. A T fitting 109 is secured to the left end of the pipe 98 and upwardly from this T fitting extends a nipple member or first run portion 111 and downwardly from another leg of the T extends another piece of pipe or second run portion 112, which is spaced a distance from the bottom of chamber 104. The upper end of the nipple 111 is below the normal liquid level of the tank 94 and is also below the level of the upper end of the pipe 63 in the intermediate chamber 23. A valve 114 is pivotally mounted in the T fitting 109 normally closing the pipe or second run portion 112. Exit of liquid from the chamber 105 is provided in the same manner as the exit of liquid from chamber 22 of the apparatus shown in FIGURES 1 and 2.

In operation, the apparatus of FIGURES 6 and 7 functions in the following manner. When the impeller is actuated, material is drawn from the surface 94 in the intermediate chamber 23 through the first conduit means which includes the pipe 63 to the underside of the impeller. Material is also drawn from the surface of the chamber 104 through the nipple 111, T fitting 109, and pipe 98 until the liquid level in chamber 104 drops down to a point which is even with the top of nipple member 111 or as is indicated by the dot-dash line 116. When this happens liquid and other material will be drawn to the impeller until the nipple 111 is empty. When this happens the liquid in pipe 112 will try to seek the level 116, opening the valve 114. When this happens, liquid and material, for example "flock," which has settled to the bottom of chamber 104 will be drawn up through the run of pipe 112 to the impeller 39. This will continue until the motor 38 is de-energized or until the liquid level 94 in the intermediate chamber 23 has risen to such a point as to provide a head of pressure which will prevent material from coming in through the pipe 98 to the T fitting 62. When the motor 38 is de-energized, liquid will flow by the force of gravity down the pipe 63, through pipe 98, and up through the nipple 111 to readjust the liquid level 94 in all of the chambers of the apparatus. This means of allowing material to pass from the intermediate chamber 23 to the chamber 104 permits the settling out of unstabilized "flock" which during the next cycle of operation is drawn from the bottom of the tank 104 up through the run of pipe 112.

It will thus be seen that sewage treatment apparatus has been provided where a plentiful supply of air is admixed with the sewage contained within the apparatus to augment aerobic bacterial decomposition of the sewage and which also serves to break up larger particles of sewage. The device also withdraws froth or scum from the surface of the tank to break the same up and completely aerate the same to aid in the decomposition process. The arrangement of the piping and the combination of chambers also serve to insure that only material which has been rendered completely stable escapes from the sewage treatment apparatus. The novel means of introducing the air into the apparatus through the housing assembly 75 also serves to keep the operating temperature of the motor down to a safe level. The construction of the housing assemblies also serve to prevent the electric motor from becoming flooded in the event of a large amount of ground water.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Sewage treating apparatus including, a tank adapted to contain sewage at a normal liquid level, a wall dividing said tank into first and second chambers, said wall completely separating said first and second chambers, entrance conduit means providing for entrance of sewage to said first chamber, an impeller mounted in said first chamber at a lower portion thereof and having first and second side portions, an air conduit extending to said first side of said impeller from outside of said tank, a first liquid conduit extending to said second side of said impeller at one end portion thereof and terminating at the other end portion thereof substantially at the liquid level in said first chamber, a second liquid conduit extending to said first liquid conduit at one end portion thereof and extending through said wall and into said second chamber at the other end portion thereof, said portion of said second liquid conduit in said second chamber including first and second run portions, said first run portion extending to a place substantially at liquid level and below the level of the other end portion of said first liquid conduit, said second run portion extending to the bottom of said second chamber, a valve interposed in said second run portion, exit conduit means providing for exit of treated sewage from said second chamber, and means for moving said impeller to cause air to be drawn to said first side of said impeller and sewage to be drawn to said second side of said impeller.

2. Apparatus for treating sewage including a tank having first and second opposed end portions, a cover closing said tank, first and second walls within said tank dividing said tank into inlet, outlet, and intermediate chambers, an inlet conduit providing communication into the upper portion of said inlet chamber, wall means defining an opening in said first wall at a spaced distance from the bottom of said inlet chamber, a tubular member mounted by said cover and extending vertically into said intermediate chamber, a drive motor mounted on said cover over the upper end of said tubular member, a drive shaft extending within said tubular member and connected at its upper end portion to said drive motor and journalled at its lower end portion by bearing means, said tubular member having a first flange on the lower end portion thereof, a second flange secured to and spaced from said first flange, an impeller secured to said lower end portion of said drive shaft for rotation therewith and positioned between said flanges, a first pipe extending from said second flange and terminating substantially at the liquid level of said intermediate chamber, a second pipe extending from the bottom portion of said outlet chamber and communicating with said first pipe, and an outlet conduit providing communication from said tank.

3. Apparatus for treating sewage including a tank having first and second opposed end portions, a cover closing said tank, first and second walls within said tank dividing said tank into inlet, outlet, and intermediate chambers, said second wall extending from the bottom of said tank and only part way to said cover, an inlet conduit providing communication into the upper portion of said inlet chamber, wall means defining an opening in said first wall at a spaced distance from the bottom of said inlet chamber, a tubular member mounted by said cover and extending vertically into said intermediate chamber, a drive motor mounted on said cover over the upper end of said tubular member, a drive shaft extending within said tubular member and connected at its upper end portion to said drive motor and journalled at its lower end portion by bearing means, said tubular member having a first flange on the lower portion thereof, a second flange secured to and spaced from said first flange, an impeller secured to said lower end portion of said drive shaft for rotation therewith and positioned between said flanges, a first pipe extending from said second flange and terminating substantially at the liquid level of said tank, a second pipe extending from the bottom portion of said outlet chamber and communicating with said first pipe, and an outlet conduit providing communication from the upper portion of said outlet chamber.

4. Apparatus for treating sewage including a tank having first and second opposed end portions, a cover closing said tank, first, second and third walls within said tank dividing said tank into first, second, third and fourth chambers, an inlet conduit providing communication into the upper portion of said first chamber, wall means defining an opening in said first wall at a spaced distance from the bottom of said first chamber, a tubular member mounted by said cover and extending vertically into said second chamber, a drive motor mounted on said cover over the upper end of said tubular member, a drive shaft extending within said tubular member and connected at its upper end portion to said drive motor and journalled at its lower end portion by bearing means, an impeller secured to said lower end portion of said drive shaft for rotation therewith, said tubular member having a first flange on the lower end portion thereof, a second flange member secured to and spaced from said first flange, a first pipe extending from said second flange and terminating substantially at the liquid level of said second chamber, said second wall completely closing said second chamber from said third and fourth chambers, a second pipe extending from said first pipe through said second wall and into said third chamber, said portion of said second pipe in said third chamber including first and second run portions, said first run portion terminating substantially at the liquid level of said third chamber, said second run portion extending to the bottom portion of said third chamber, a one-way valve interposed in said second run portion, said third wall between said third and fourth chambers being spaced from the bottom of said tank, and an outlet conduit providing communication from the upper portion of said fourth chamber.

5. Apparatus for treating sewage including a tank having first and second opposed end portions, a cover closing said tank, first and second walls within said tank dividing said tank into inlet, outlet, and intermediate chambers, said first wall extending from the bottom to the top of said tank, said second wall extending from the bottom of said tank partially to the top thereof, a baffle extending from the top of said tank and adjacent said second wall to define an opening between said outlet and intermediate chambers, an inlet conduit providing communication into the upper portion of said inlet chamber, wall means defining an opening in said first wall at a spaced distance from the bottom of said inlet chamber, air introduction and agitating means comprising a tubular member mounted by said cover and extending vertically into said intermediate chamber, a drive motor mounted on said cover over the upper end of said tubular member, a drive shaft extending within said tubular member and connected at its upper end portion to said drive motor and journalled at its lower end portion by bearing means, an impeller secured to said lower end portion of said drive shaft for rotation therewith, an annular member surrounding said drive motor and having an open upper end, a circular cover member having first and second vertically extending passageway means on opposed sides thereof providing for entrance of air from the exterior to the interior thereof, said circular cover member having an overhanging flange for preventing material from entering said passageway means, said circular cover member surrounding and spaced from said annular member, an interconnecting tube providing communication between said tubular member and said annular member, said tubular member having a first flange on the lower end portion thereof, a second flange member secured to and spaced from said first flange, a first pipe extending from said second flange and terminating substantially at the liquid level of said intermediate chamber, a second pipe extending from the bottom portion of said outlet chamber through said opening between said outlet and said intermediate chamber and communicating with said first pipe, an outlet conduit providing communication from the upper portion of said outlet chamber, and a weir secured to said tank adjacent said outlet conduit.

6. Apparatus for treating sewage including a tank having first and second opposed end portions, a cover closing said tank, first and second walls within said tank dividing said tank into inlet, outlet, and intermediate chambers, a third wall dividing said outlet chamber into first and second compartments, said third wall being spaced from the bottom of said outlet chamber and providing an opening between said first and second compartments, said second wall extending from the bottom to the top of said tank, an inlet conduit providing communication into the upper portion of said inlet chamber, wall means defining an opening in said first wall, air introduction and agitating means comprising a tubular member mounted by said cover and extending vertically into said intermediate chamber, a drive motor mounted on said cover and over the upper end of said tubular member, a drive shaft extending within said tubular member and connected at its upper end portion to said drive motor and journalled at its lower end portion by bearing means, an impeller secured to said lower end portion of said drive shaft for rotation therewith, an annular member surrounding said drive motor and having an open upper end, a circular cover member having first and second vertically extending passageway means on opposed sides thereof providing for entrance of air from the exterior to the interior thereof, said circular cover member having an overhanging flange for preventing material from entering said passageway means, said circular cover surrounding and spaced from said annular member, an interconnecting tube providing communication between said tubular member and said annular member, said tubular member having a first flange on the lower end portion thereof, a second flange member secured to and spaced from said first flange, a first pipe extending from said second flange and terminating substantially at the liquid level of said intermediate chamber, a second pipe extending through said second wall and into said first compartment of said outlet chamber, said second pipe having first and second run portions, said first run portion terminating substantially at the liquid level of said first compartment of said outlet chamber, said second run portion extending to the bottom portion of said first compartment of said outlet chamber, a one-way valve in said second run portion, an outlet conduit providing communication from the upper portion of said second compartment of said outlet chamber, and a weir secured to said tank adjacent said outlet conduit.

7. Apparatus for treating sewage including a tank having first, second and third chambers, an inlet conduit providing entrance for sewage into said first chamber, wall means defining an opening from said first to said second chamber, a tubular member extending into said second chamber from outside said tank, said member having a first flange on an end portion thereof, a second flange secured to and spaced from said first flange, a drive shaft extending within said tubular member to said flanges, an impeller having first and second side portions between said flanges, first conduit means secured to said second flange at one end portion and at the other end portion terminating substantially at the liquid level in said tank to supply material from the liquid level to the second side portion of said impeller, second conduit means communicating with said first conduit means at one end portion thereof and with the other end portion extending into the lower portion of said third chamber, an outlet conduit providing for exit of treated sewage from said third chamber, and means for moving said drive shaft whereby air is drawn from the outside through said tubular member to said first side of said impeller and material is drawn through said first and second conduit means to the second side of said impeller.

8. A housing for a motor mounted on a surface including an annular member surrounding said motor and having an open upper end, an annular cover surrounding and spaced from said annular member and having a closed upper end, wall means defining passages on opposed sides of said cover extending from an upper portion to a lower portion of said cover, said passages having openings at their upper end portions for the passage of outside air thereinto and openings at their lower end portions for the passage of air into the space between said annular member and said cover, and a lip overhanging said openings at the upper end portion of said passages.

9. A housing for a motor mounted upon a member including an annular cover having a peripheral bottom wall engaging said member and defining an open bottom end, the top end of said cover being closed, said cover member surrounding said motor, wall means in said cover defining passages for introducing air into the lower portion of said annular cover, an annular air passage member in said cover member, said air passage member extending upwardly from the lower portion of said cover member and terminating at an upper portion of said cover member, and means for bringing air in said passages and into the upper portion of said air passage member whereby said air aids in cooling said motor.

10. Apparatus for treating sewage including a tank having first and second opposed end portions, a cover closing said tank, first and second walls within said tank dividing said tank into first, second and third chambers, an inlet conduit providing communication into the upper portion of said first chamber, wall means defining an opening in said first wall near the bottom of said first chamber, a tubular member mounted by said cover and extending vertically into said second chamber, a drive motor mounted on said cover over the upper end of said tubular member, a drive shaft extending within said tubular member and connected at its upper end portion to said drive motor and journalled at its lower end portion by bearing means, said tubular member having a first flange on the lower end portion thereof, a second flange member secured to and spaced from said first flange, an impeller secured to said lower end portion of said drive shaft for rotation therewith and positioned between said flanges, a first pipe extending from said second flange substantially to the liquid level of said second chamber, a second pipe extending from said first pipe through said second wall and into the bottom of said third chamber, and an outlet conduit providing communication from the upper portion of said third chamber.

11. Apparatus for treating sewage including a tank having first and second opposed end portions, a cover closing said tank, first and second walls within said tank dividing said tank into inlet, intermediate and outlet chambers, an inlet conduit providing communication into the upper portion of said inlet chamber, wall means defining an opening in said first wall near the bottom of said inlet chamber, air introduction and agitating means comprising a tubular member mounted by said cover and extending vertically into said intermediate chamber, a drive motor mounted on said cover over the upper end of said tubular member, a drive shaft extending within said tubular member and connected at its upper end portion to said drive motor and journalled at its lower end portion by bearing means, an annular member surrounding said drive motor and having an open upper end, a circular cover member having first and second vertically extending passageway means on opposed sides thereof providing for entrance of air from the exterior to the interior thereof, said circular cover member having an overhanging flange for preventing material from entering said passageway means, said circular cover member surrounding and spaced from said annular member, an interconnecting tube providing communication between said tubular member and said annular member, said tubular member having a first flange on the lower end portion thereof, a second flange member secured to and spaced from said first flange, an impeller secured to said lower end portion of said drive shaft for rotation therewith and positioned between said flanges, froth conduit means extending from said second flange substantially to the liquid level of said intermediate chamber, recirculating conduit means extending through said second wall and providing communication between said second flange and the bottom of said outlet chamber, an outlet conduit providing communication from the upper portion of said outlet chamber, and a weir secured to said tank adjacent said outlet conduit.

12. Sewage treating apparatus including, a tank adapted to contain sewage, wall means dividing said tank into first and second chambers, entrance means providing for entrance of sewage into said first chamber, an impeller having inlet means and mounted in said first chamber, first conduit means extending to said impeller inlet means at one end portion thereof and extending to an upper portion of said first chamber at the other end portion thereof, air conduit means communicating with said impeller inlet means to supply air thereto, second conduit means communicating with said impeller inlet means at one end portion thereof and extending through said wall means and into a lower portion of said second chamber at the other end portion thereof, third conduit means communicating with said impeller inlet means at one end portion thereof and into an upper portion of said second chamber at the other end portion thereof, valve means between said second and third conduit means to control the flow in said second and third conduit means, exit conduit means providing for exit of treated sewage from said second chamber, and means for moving said impeller.

13. Sewage treating apparatus including, a tank adapted to contain sewage, wall means dividing said tank into first and second chambers, entrance means providing for entrance of sewage into said first chamber, an impeller having inlet means and mounted in said first chamber, first conduit means extending to said impeller inlet means at one end portion thereof and extending to an upper portion of said first chamber at the other end portion thereof, second conduit means communicating with said impeller inlet means at one end portion thereof and extending through said wall means and into a lower portion of said second chamber at the other end portion thereof, third conduit means communicating with said impeller inlet means at one end portion thereof and into an upper portion of said second chamber at the other end portion thereof, valve means between said second and third conduit means to control the flow in said second and third conduit means, exit conduit means providing for exit of treated sewage from said second chamber, and means for moving said impeller.

References Cited in the file of this patent

UNITED STATES PATENTS

| 656,249 | Herman | Aug. 21, 1900 |
| 1,283,159 | Groch | Oct. 29, 1918 |
| 2,417,895 | Fahrenwald | May 30, 1922 |
| 2,138,349 | Mallory | Nov. 29, 1938 |
| 2,174,147 | Unger | Sept. 26, 1939 |
| 2,326,303 | Moerk et al. | Aug. 10, 1943 |
| 2,515,538 | Wall | July 18, 1950 |
| 2,597,802 | Kappe | May 20, 1952 |
| 2,622,858 | Hughes | Dec. 23, 1952 |
| 2,889,047 | Coate | June 2, 1959 |

FOREIGN PATENTS

| 893,470 | Germany | Oct. 15, 1953 |